(12) United States Patent
Murouchi et al.

(10) Patent No.: US 7,790,786 B2
(45) Date of Patent: *Sep. 7, 2010

(54) WHOLLY AROMATIC LIQUID CRYSTAL POLYESTER RESIN COMPOSITION AND OPTICAL PICKUP LENS HOLDER

(75) Inventors: Satoshi Murouchi, Yokohama (JP); Toshio Nakayama, Kawasaki (JP); Yoshikuni Yamada, Kawasaki (JP)

(73) Assignee: Nippon Oil Corporation, Tokyo (JP)

( * ) Notice: Subject to any disclaimer, the term of this patent is extended or adjusted under 35 U.S.C. 154(b) by 337 days.

This patent is subject to a terminal disclaimer.

(21) Appl. No.: 11/578,980

(22) PCT Filed: Apr. 19, 2005

(86) PCT No.: PCT/JP2005/007761

§ 371 (c)(1),
(2), (4) Date: Oct. 18, 2006

(87) PCT Pub. No.: WO2005/103150

PCT Pub. Date: Nov. 3, 2005

(65) Prior Publication Data

US 2007/0173565 A1 Jul. 26, 2007

(30) Foreign Application Priority Data

Apr. 22, 2004 (JP) .............................. 2004-126655
Apr. 1, 2005 (JP) .............................. 2005-106295

(51) Int. Cl.
 C08J 9/32 (2006.01)
(52) U.S. Cl. ............ 523/219; 428/35.7; 428/36.6; 428/474.4; 428/220; 428/421; 524/445; 524/430; 524/494

(58) Field of Classification Search .............. 369/44.15, 369/44.14, 44.23, 44.16; 359/814, 813; 250/201.5; 428/1.1

See application file for complete search history.

(56) References Cited

U.S. PATENT DOCUMENTS 5,348,990 A * 9/1994 Walpita et al. .............. 523/219

(Continued)

FOREIGN PATENT DOCUMENTS

JP 2004-1487 1/2004

OTHER PUBLICATIONS

Ticona NPL document, Vectra liquid crystal polyester properties.*

(Continued)

*Primary Examiner*—David R Sample
*Assistant Examiner*—Michael B Nelson
(74) *Attorney, Agent, or Firm*—Weingarten, Schurgin, Gagnebin & Lebovici LLP

(57) ABSTRACT

An optical pickup lens holder which comprises a wholly aromatic liquid crystalline polyester resin composition comprising 97 to 45 mass percent of a wholly aromatic liquid crystalline polyester having a melting point of 320° C. or higher, 3 to 50 mass percent of an inorganic spherical hollow material having an aspect ratio of 2 or less and 0 to 30 mass percent of an inorganic filler having as aspect ratio of 4 or more, wherein the percentages are made to 100 mass percent in total, and having a specific gravity in the range of 1.00 to 1.35. The lens holder exhibits excellent characteristics, while retaining good heat resistance in soldering and good processability inherent in a liquid crystalline polyester, exhibits high injection processability and high adaptability to a soldering process even in a sheet form lens holder having a thin part and an opening port.

7 Claims, 3 Drawing Sheets

U.S. PATENT DOCUMENTS

| | | | |
|---|---|---|---|
| 5,837,366 A * | 11/1998 | Tanaka | 428/327 |
| 5,965,639 A | 10/1999 | Yamauchi et al. | |
| 6,317,277 B1 * | 11/2001 | Izumino et al. | 359/813 |
| 2001/0012862 A1 * | 8/2001 | Maeda | 523/219 |
| 2006/0047100 A1 | 3/2006 | Murouchi et al. | |

OTHER PUBLICATIONS

Ticona NPL Document, Vectra liquid crystal polyester properties, http://www.tincona.com.br/home/portfolio/vectra.htm Accessed Jan. 26, 2009. No Publication Date Available.*

* cited by examiner

Right Side View

Front View

WHOLLY AROMATIC LIQUID CRYSTAL POLYESTER RESIN COMPOSITION AND OPTICAL PICKUP LENS HOLDER

This application is a §371 national phase filing of PCT/JP2005/007761 filed Apr. 19, 2005, and claims priority to Japanese application No. 2004-126655 filed Apr. 22, 2004, and Japanese application No. 2005-106295 filed Apr. 1, 2005.

TECHNICAL FIELD

The present invention relates to a wholly aromatic liquid crystal polyester resin composition used for an optical pickup lens holder applied in an information recording and reproducing device and relates to the optical pickup lens holder which contains an injection molded product of said resin composition as a component.

BACKGROUND ART

The optical pickup is applied in compact disk, laser disk, video disk, photo-electro magnetic disk and the like, is made to scan information recorded on a disk by irradiating a semi-conductor laser in controlling to several μm diameter spot by lens, and consists of, commonly, an optical flame which fixes optical element and the like of photo-emitting element, photo-detection element mirror and the like, and of an actuator part which makes an object lens and an object lens holder to make follow-up to the movement of the optical lens, and of a base flame which forms an optical path of the optical flame by keeping the actuator part.

In recent years, the weight reduction and cost reduction of the optical pick up are accelerated, and a trial to replace the component material from a metal to a resin has been done, and especially, a liquid crystal polyester resin among thermoplastic resins has been paid attention as the optical pickup component such as the lens holder and the base flame for the excellence of mechanical properties, processability, dimensional accuracy, heat resistance, and vibration damping properties (Refer to Patent Document 1).

However, information which is dealt by the recent digital disc driving device, is made to have a large capacity, and a scanning is made to speed-up, and also, the occupied volume of the optical pickup component itself is made to be required to reduce so that more sophisticated characteristic properties have been made to be required even to the made-up liquid crystal polyester resin. For example, a composition with specific liquid crystal polyester and inorganic filler which corresponds to the optical pickup having the complicate structure and the thin thickness part (Refer to Patent Document 2), a composition containing cycloolefin polymer having small variation of dimensional accuracy with time (Refer to Patent Document 3), a composition containing specific particulate filler material corresponding to vibration damping properties and low flash properties (Refer to Patent Document 4), a composition containing the specific liquid crystal polyester and glass fiber (Refer to Patent Document 5), have been proposed.

Patent Document 1: JP62-236143 A
Patent Document 2: JP08-220407 A
Patent Document 3: JP11-185272 A
Patent Document 4: JP2000-273292 A
Patent Document 5: JP2001-288342 A However, the above proposals do not realize or anticipate sufficiently to the items which are required for the recent optical pickup lens holder.

Initially, the optical pickup component, of which structure is made to be circular, ellipse or polygonal sheet form structure, as the essential requirement of space saving and energy saving of the device, is required to high flowability and good appearance having no occurrence of flash while the injection molding, and simultaneously, the component material is required to aim at the lower specific gravity for the purpose of improving the driving sensitivity and of saving the electric power consumption while driving the pickup.

Moreover, the start of the use of non-lead soldering has been studied from the environmental problem so that the soldering heat resistance becomes important element more than ever before. In the sheet form lens holder having thin thickness part the problem has been made to be especially important.

Furthermore, the influence by heat emitted from the driving coil while driving has become in the news as the problem accompanying with the downsizing of the device. Namely, generally for the optical pickup lens, the plastic lens is applied from the point of the cost and the driving coil is made to provide in adjacent position of the lens because of the downsizing, and when the atmospheric temperature in the vicinity of the optical pickup lens raises by heat emitted from the driving coil while driving, thermal expansion of the lens occurs so that phenomena which a spot of a laser deviates from the point occurs and it is found to cause scanning error.

Especially, incase that the optical pickup lens holder has a structure in which the focusing coil attached to the same lens holder locates in the adjacent position to the lens attached to the same lens holder, for example, in case that the optical lens holder has an opening port in the center, and the coil is inserted into said opening port, the problem has become important. Such structures are disclosed in, for example, JP7-29194A, JP10-21570A.

DISCLOSURE OF THE INVENTION

The purpose of the present invention is to provide a method to solve problems such as heat resistance of soldering reflow and the like corresponding to non-lead soldering process, the injection molding processability adapted for the molding of the optical pickup lens holder having thin thickness part, light weight capable to driven in low driving force, low thermal conductivity which do not conduct the emission of coil heat to the lens and the like, by applying the polyester resin composition made by the specific liquid crystal polyester resin and the specific filler in the optical pickup lens holder part.

The present inventor has led to the present invention to find that by using the resin composition which contains a specific composition ratio of the specific wholly aromatic liquid crystal polyester having heat resistance, inorganic hollow filler, and inorganic filler, as component material of the optical pickup lens holder, the temperature rise in the vicinity of the optical pickup kept in the optical pickup lens holder can be controlled by the synergetic effect with the weight saving and lowering thermal conduction of said part, and lowering heat release of the coil by the reduction of the driving force.

Namely, the first aspect of the present invention relates that a wholly aromatic liquid crystal polyester resin composition being applied to an injection molding of an optical pickup lens holder for providing an injection molded product having a specific gravity in a range of 1.00 to 1.35, comprising 97 to 45 percent by mass of a wholly aromatic liquid crystal polyester having melting point of 320° C. or higher, 3 to 50 percent by mass of an inorganic spherical hollow material having an aspect ratio of 2 or less, and 0 to 30 percent by mass (100 percent by mass in total of said three ingredients) of an inorganic filler having an aspect ratio of 4 or more.

The second aspect of the present invention relates that the wholly aromatic liquid crystal polyester resin composition according to claim 1, wherein said wholly aromatic liquid crystal polyester is prepared by the polycondensation of 80 to 100 percent by mole of p-hydroxybenzoic acid (I), terephthalic acid (II), and 4,4'-dihydroxydiphenyl (III) (including their derivatives) (provided that a total of (I) and (II) is made to more than 60 percent by mole) and 0 to 20 percent by mole of other aromatic compound capable to conduct a polycondensation reaction with any one of (I), (II), or (III).

The third aspect of the present invention relates that the wholly aromatic liquid crystal polyester resin composition according to the first aspect or the second aspect, wherein an apparent viscosity at melting point +20° C. of said wholly aromatic liquid crystal polyester is 5,000 poise or less. is characterized in that an apparent viscosity at melting point +20° C. of said wholly aromatic liquid crystal polyester is 5,000 poise or less.

The fourth aspect of the present invention relates the wholly aromatic liquid crystal polyester resin composition according to any one of the first aspect to the third aspect, wherein the inorganic spherical hollow material having an aspect ratio of 2 or less is an average particle diameter of 5 to 200 μm, and a rate of volume hollowness of 50 percent or more.

The fifth aspect of the present invention relates the wholly aromatic liquid crystal polyester resin composition according to any one of the first aspect to the fourth aspect, wherein the inorganic filler having an aspect ratio of 4 or more is any one selected from a glass fiber having an average diameter of 20 μm or less and a talc having an average particle diameter of 100 μm or less and simultaneously, is contained in a range of 5 to 15 percent by mass in the composition.

The sixth aspect of the present invention relates the optical pickup lens holder in a sheet form driven by a focusing coil and a tracking coil, comprising an injection molded product having a specific gravity (in here the specific gravity of the molded product) in a range of 1.00 to 1.35, obtained from the wholly aromatic liquid crystal polyester resin composition, comprising 97 to 45 percent by mass of the wholly aromatic liquid crystal polyester having a melting point of 320° C. or higher, 3 to 50 percent by mass of the inorganic spherical hollow material having an aspect ratio of 2 or less, and 0 to 30 percent by mass (100 percent by mass as a total of said three components) of the inorganic filler having an aspect ratio of 4 or more.

The seventh aspect of the present invention relates the optical pickup lens holder according to the sixth aspect, wherein said optical pickup lens holder comprises a part with thickness of 0.3 mm or less and flexural modulus of said part is made to be 10 GPa or more.

The eighth aspect of the present invention relates the optical pickup lens holder according to the sixth aspect or the seventh aspect, wherein said optical pickup lens holder comprises a hole part to hold a coil bobbin for the focusing coil or the tracking coil.

According to the present invention, even a sheet form optical pickup lens holder having thin thickness part or opening port, the optical pickup lens holder which the applicability to injection processability and to soldering process are excellent and temperature increase in the vicinity of driving coil is regulated, can be obtained.

BEST MODE FOR CARRYING OUT THE INVENTION

Figure 1:
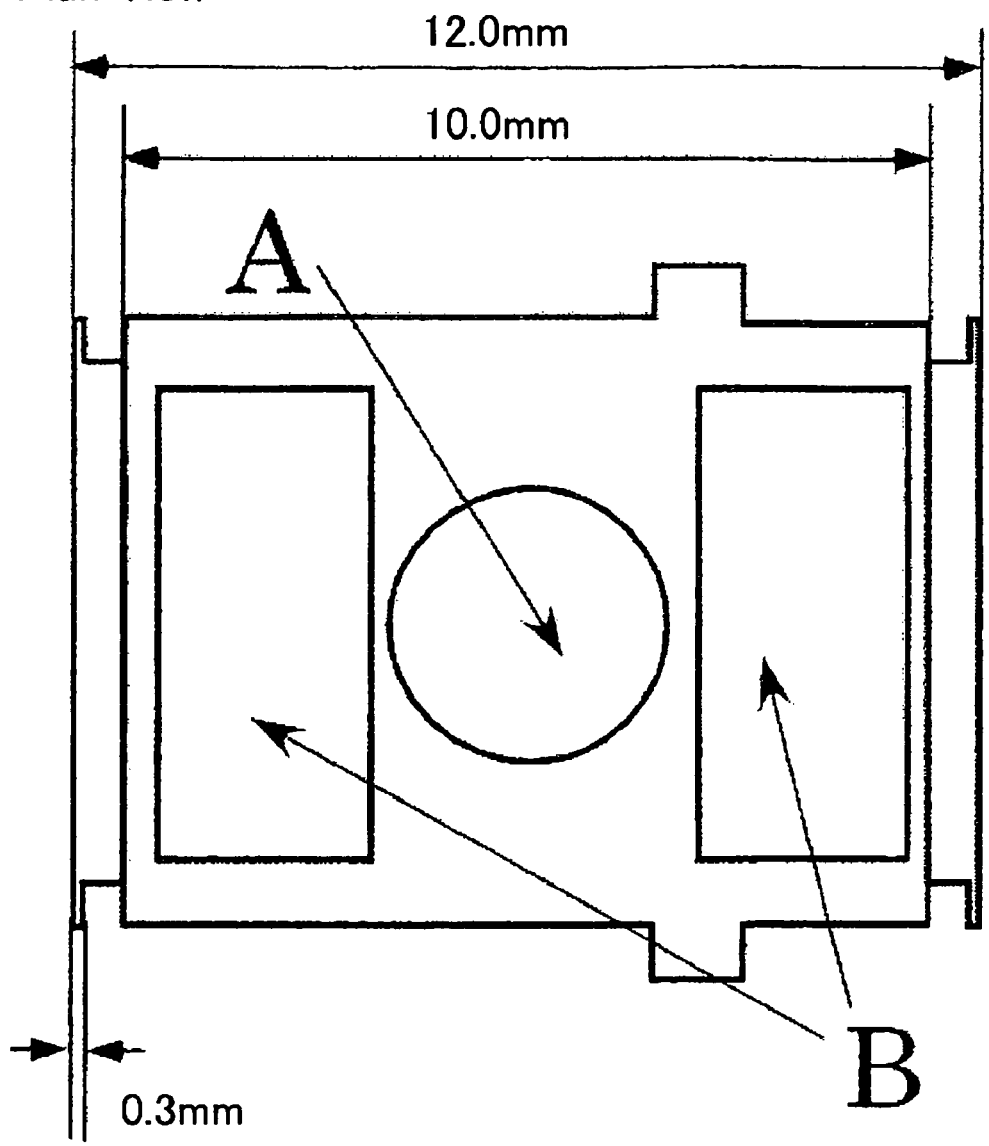
FIG. 1 illustrates a plan view of an optical pickup lens holder shape used for a performance evaluation. A shows an opening port for lens, and B shows an opening port for coil in FIG. 1.
Figure 2:
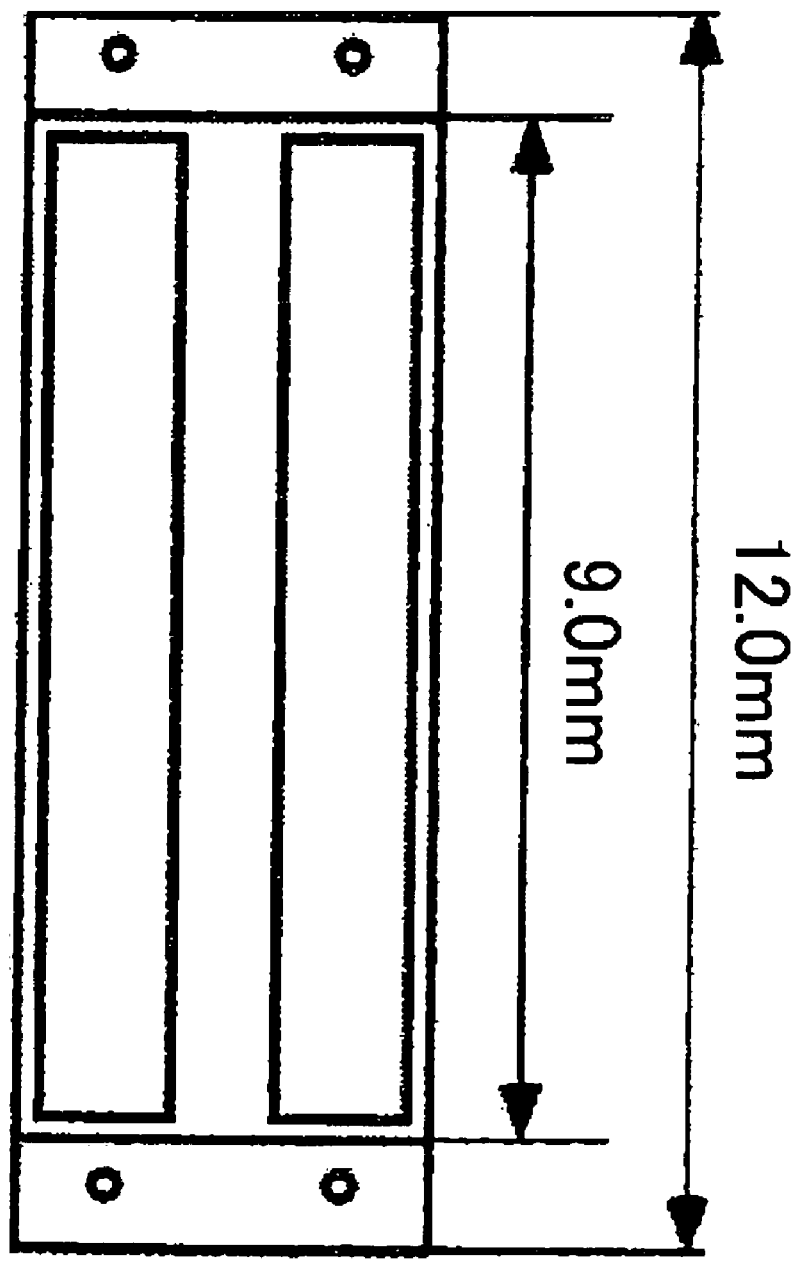
FIG. 2 is a right side view of said lens holder.
Figure 3:
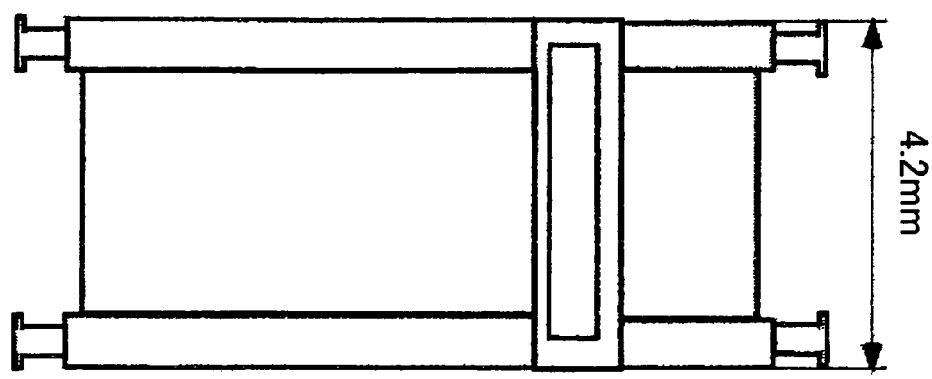
FIG. 3 is a front view thereof.

The present invention is described in detail as follows.

A wholly aromatic liquid crystal polyester applied in the present invention is a polyester which is generally called as thermotropic liquid crystal polymer and which forms an anisotropic melt. The liquid crystal polyester of the present invention is the resin having the melting point of 320° C. or higher. The melting point is defined as an endothermic peak which is detected by a differential scanning calorimeter and the measurement method in detail is that the endothermic peak Tm1 of the polymer is obtained by melting under a raising temperature rate of 20° C./minute starting from the room temperature and after the temperature is raised to Tm1+40° C., the molten polymer is cooled to 150° C. under a cooling rate of 10° C./minute, and then the endothermic peak Tm2 is obtained when the temperature is raised under the raising temperature rate of 20° C./minute and the Tm2 is defined as the melting point. The melting point at 320° C. or higher is defined as the endothermic peak which is detected at least in the range of 320° C. or higher, and other peaks below 320° C. are acceptable to be detected, as far as Tm2 exists at 320° C. or higher. Polymers in case of having the melting point below 320° C. are not preferable since the reduced heat resistance is not tolerable for the soldering process.

As the structural units of the liquid crystal polyester applied in the present invention, for example, that comprising a combination of an aromatic dicarboxylic acid, an aromatic diol and an aromatic hydroxycarboxylic acid, that comprising a different aromatic hydroxycarboxylic acids, that comprising a combination of an aromatic dicarboxylic acid and an aromatic diol, that formed by reacting a polyester such as polyethylene terephthalate and the like with an aromatic hydroxycarboxylic acid and the like, are given, and namely the structural units are listed as following examples.

Any of following repeating structural units derived from aromatic hydroxycarboxylic acids:

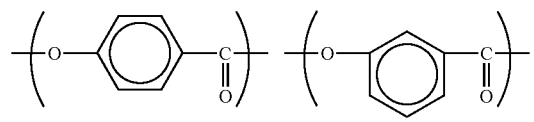
(A₁)

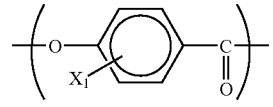
(X₁ halogen atoms, or alkyl group)

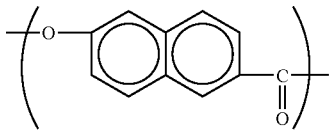
(A₂)

-continued
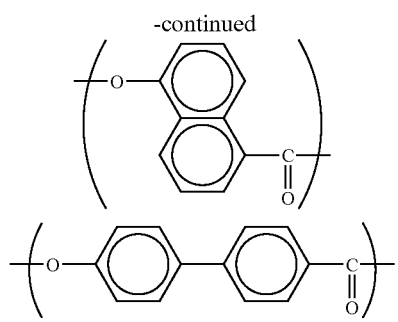
Any of following repeating structural units derived from aromatic dicarboxylic acids:
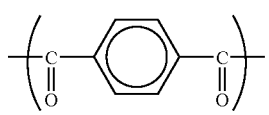
(B₁)
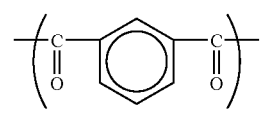
(B₂)
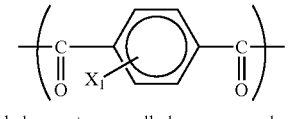
(X₂ halogen atom, or alkyl group or aryl group)
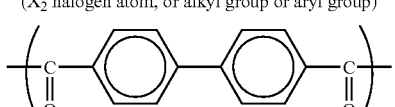
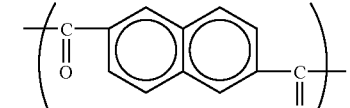
(B₃)
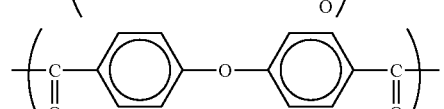
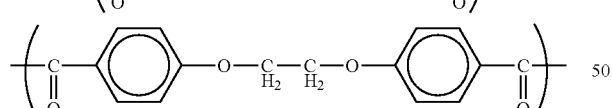
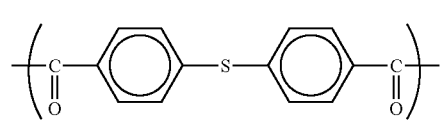
Any of following repeating structural units derived from aromatic diols:
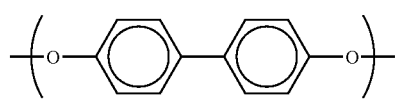
(C₁)
-continued
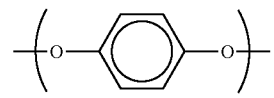
(C₂)
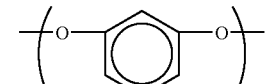
(C₃)
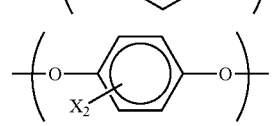
(X₂: halogen atom, alkyl group, or aryl group)
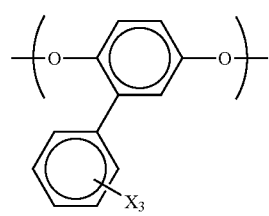
(X₃: H, halogen atom, or alkyl group)
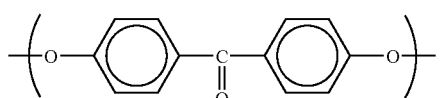
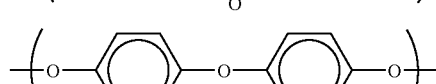
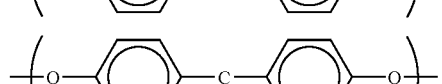
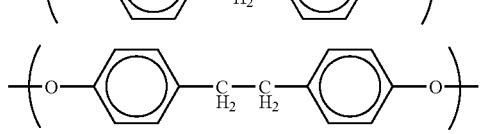
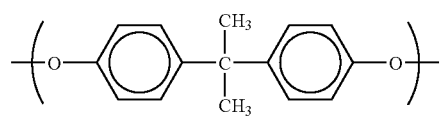
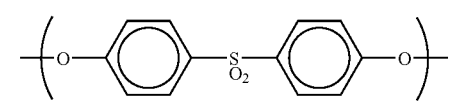
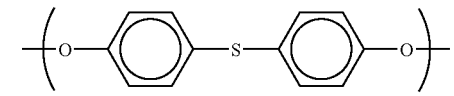
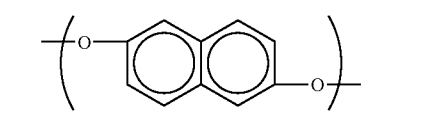
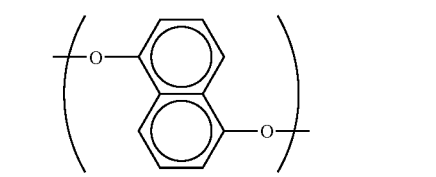

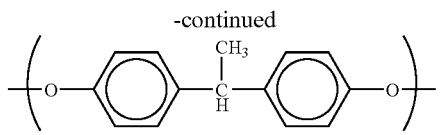

The liquid crystal polyester which is preferable from the standpoint of balance of heat resistance, mechanical properties and processability, is the polyester which contains 30 percent by mol or more of any one of the above mentioned structural unit group represented by ($A_1$), and more preferably 60 percent by mol or more in a total of any one of ($A_1$) group and any one of ($B_1$) group. By fulfilling the above conditions a rigidity of the molecular structure is acquired and an excess stress which is provided during melt-mixing by a twin-screw extruder and the like and during injection molding is eliminated so that fractures of hollow materials can be reduced.

Also, by decreasing a latent heat of fusion of crystalline part, since a quantity of heat required to melt reduces and the solid state resin easily changes to molten state, not many inorganic spherical hollow materials are fractured in the melt extrusion process under heating. Moreover, by applying the polyester having the apparent viscosity of 5,000 poise or less at the melting point +20° C. of the liquid crystal polyester, the effect can be ensured more.

Furthermore, as combinations of the above repeating structural units, the following combinations are preferable.

($A_1$), ($B_1$), ($C_1$).
($A_1$), ($B_1$), ($B_2$), ($C_1$).
($A_1$), ($B_1$), ($B_2$), ($C_2$).
($A_1$), ($B_1$), ($B_3$), ($C_1$).
($A_1$), ($B_1$), ($B_3$), ($C_2$).
($A_1$), ($B_1$), ($B_2$), ($C_1$), ($C_2$).
($A_1$), ($A_2$), ($B_1$), ($C_1$).

Here, when describing groups containing multiple structural units, the above mentioned structural unit shows any structural unit which is contained in each group.

As especially preferable monomer composition, the aromatic polyester is prepared by the polycondensation of 80 to 100 percent by mole in total of p-hydroxybenzoic acid, terephthalic acid, and 4,4'-dihydroxydiphenyl (including their derivatives), and 0 to 20 percent by mole of the polycondensation-capable aromatic compound which is selected from a group consisting of aromatic diols, aromatic hydroxycarboxylic acids, and aromatic dicarboxylic acids other than the above aromatic compounds (A total of both is made to 100 percent by mole.). p-Hydroxybenzoic acid, terephthalic acid, and 4,4'-dihydroxy diphenyl are not preferable to be made 80 percent by mol or less because of the reduced heat resistance. Here, the wholly aromatic liquid crystal polyester can be used together in two kinds or more.

Known methods can be adopted for preparation methods of liquid crystal polyester resins used in the present invention. Production methods can be applied by only a molten polymerization or by a two-stage polymerization with the molten polymerization and the solid phase polymerization. As an example in detail, monomers, selected from aromatic dihydroxy compounds, aromatic dihydroxycarboxylic acids and aromatic dicarboxylic acids are fed into a reactor, and after hydroxyl group of monomer is acetylated by an introduction of acetic anhydride, resins are produced by deacetic acid polycondensation reaction.

For example, a polyester production method is given where p-hydroxybenzoic acid, terephthalic acid, isophthalic acid, and 4,4'-biphenol are introduced into the reactor under nitrogen gas atmosphere and acetic anhydride is added to conduct acetoxylation while refluxing acetic anhydride, and then deacetic acid melt polycondensation is conducted while distilling acetic acid by raising temperature in the range of 150 to 350° C. Polymerization time can be selected in the range of one hour to several tens of hours. In the production of the thermotropic liquid crystal polyester of the present invention, prior to the production, drying of monomers may or may not be conducted.

In case that further solid phase polymerization proceeds to the polymer obtained by the molten polymerization, after the polymer obtained by the molten polymerization is solidified and is ground subsequently to make powder or flake form, by the known solid phase polymerization methods, for example, thermal treatment is conducted in the temperature range of 200 to 350° C. for one hour to 30 hours under inactive atmosphere such as nitrogen gas and the like. The solid phase polymerization may proceed under agitation or the stilled state without agitation.

In the polymerization reaction, catalysts may or may not be used. As catalysts for use, the conventionally known catalysts used as polyester polycondensation catalysts can be applied, namely metallic salts such as magnesium acetate, stannous acetate, tetra butyl titanate, lead acetate, sodium acetate, potassium acetate, antimony trioxide and organic compound catalysts such as N-methylimidazole.

Also, although polymerization vessels for molten polymerization are not limited specifically, polymerization vessels equipped with various types of agitator, such as anchor type, multi-stage type, spiral belt type, spiral axis type or modified ones of them, namely Werner type mixer, Banbury mixer, pony mixer, muller mixer, roll mill, continuously controllable Ko-kneader, pug mill, gear compounder, can be preferably selected.

Inorganic spherical hollow materials with aspect ratio of 2 or less are blended for the purpose of lowering thermal conductivity and lowering specific gravity of the molded product mainly. Inorganic materials such as alumina, silica, zirconia, magnesia, glass, Shirasu, flyash, borate, phosphate, ceramics and the like can be listed as examples. Since the hollow materials are inevitable to break by receiving stress histories during composition production process or molding process, having higher strength is preferable, but seeking high strength leads to adopt a high density material which causes a heavy molded product and the commercial value of the molded product is sometimes reduced.

In case of considering for the application to electronic parts, from the stand point of balance, micro hollow materials so called glass balloon, Shirasu balloon, and ceramic balloon are preferably to be given, and the glass balloon is the most preferable material.

An aspect ratio of the inorganic spherical hollow material exceeding 2 is not preferable since a hollow material is easily broken. The micro spherical hollow material in the present invention is preferable to have the average particle diameter of 5 to 200 μm, and specifically preferable of 10 to 100 μm. Also the rate of volume hollowness of the micro hollow material is preferable to be 50 percent or more for lowering thermal conductivity and specific gravity, and 80 percent or less is preferable for a control of fracture rate of the micro hollow material. The rate of volume hollowness can be derived as 100×(1−true specific gravity of micro hollow material/material specific gravity of micro hollow material). The volume hollow rate of the micro hollow material in 50 percent or less is not preferable since the effect to make the decrease of lowering thermal conductivity and specific gravity is low.

Also, the volume hollow rate of the micro hollow material in 80 percent or more is not preferable since the thermal conductivity and specific gravity of the composition obtained arise spread-data by the increase of fracture rate of the micro hollow material during melt extrusion.

Detail examples include glass bubbles (Trade name: Scotch Light S-60) manufactured by Sumitomo 3M Limited, and glass micro hollow material (Trade name: Cel StarPZ-6000) manufactured by Tokai Kogyo Co. Ltd. If required, in order to improve adhesiveness to the wholly aromatic liquid crystal polyester, a silane coupling agent can be used for a preliminary treatment.

In case that the blending amount of inorganic spherical hollow material is 3 percent by mass or less, a reduction effect of specific gravity and a lowering thermal conductivity of the molded product are not sufficient and exceeding 50 percent by mass is not preferable for the reduction of flowability of resin composition during the injection molding. In order to give those effects more preferably, the blending amount is made to be 5 percent by mass or more, and more preferably in the range of 10 percent by mass and not exceeding 50 percent by mass. Here, more than two kinds of inorganic spherical hollow materials can be used at the same time.

In case that the higher rigidity of the molded product in the present invention is required, depending on a requirement, the inorganic filler having the aspect ratio 4 or more can be added up to 30 percent by mass (A total of said wholly aromatic liquid crystal polyester and said inorganic spherical hollow material is 100 percent by mass.). An excess of 30 percent by mass is not preferable since a reduced flowability occurs, and during the melt mixing and the injection molding, the internal stress increases so that the inorganic spherical hollow material is possibly fractured.

As the inorganic fillers having the aspect ratio of 4 and more used in the present invention, for example, glass fibers, asbestos fibers, silica fibers, silica alumina fibers, potassium titanate fibers, carbon or graphite fibers; and metallic fibrous materials such as aluminum, titanium and copper and the like; and talc, mica, glass flake, and wollastonite, are listed.

Among them, the addition of 5 to 15 percent by mass of glass fibers having the average particle size of 20 μm or less and the talc having average particle size of 100 μm or less provides wholly aromatic liquid crystal polyester resin composition product with excellent balance. Here, two kinds or more of said inorganic filler can be used together.

In the present invention, other fillers which do not interfere with the effect in said range can be listed, for example, carbon black, graphite; and silicate esters such as silica, ground quartz, glass beads, glass powders, calcium silicate, aluminum silicate, talc, clay, diatomaceous earth and the like; iron oxide, titanium oxide, zinc oxide, antimony trioxide, alumina, calcium sulfate; other various metallic powders; various metallic foils and organic fillers and the like as heat resistant high strength fiber, such as fluoro-based polymer, aromatic polyester, aromatic polyimide, polyamide and the like.

Moreover, required characteristics can be given by the addition of common additives or other thermoplastic resins to the composition of the present invention within the range which does not damage the purpose of the present invention, such as antioxidants and thermal stabilizers (e.g. hindered phenolics, hydroquinone, phosphates and their substituted products and the like); UV absorbers (e.g. resolucinol, salicylate, benzotriazole, benzophenone and the like); slip agents and mold release agents (montanic acid and the salt, and the ester, and the half ester; stearyl alcohol, stearylamide, and polyethylene wax and the like); coloring agents including dye (e.g. nigrosine and the like), and pigments (e.g. cadmium sulfide, phthalocyanine, carbon black and the like); plasticizers antistatic agents; flame retardants.

The wholly aromatic liquid crystal polyester resin composition according to the present invention can be obtained by the method which is used generally in said technical field and there is no restriction specifically for the production method. As the preferable production method, by extruders having a pair of double-threaded screw, a method includes that after the wholly aromatic liquid crystal polyester which is fed from a hopper is melted, the inorganic spherical hollow material is fed into a feed gate which is positioned in the half way. The extruders are called twin-screw extruders comprising preferably to be co-rotating that is capable to make uniform dispersion of the inorganic spherical hollow material by having self-wiping mechanism, and to have a large space between barrel and screw with cylinder diameter of 40 mmϕ or more to make easy bite of the inorganic spherical hollow material. Furthermore, when the intermeshing rate of 1.45 or more between barrel-screw is used, fracture of inorganic spherical hollow material can be avoided and the effect of lowering thermal conductivity is not ruined.

Exceeding the specific gravity 1.35 is not preferable since the driving sensitivity of the pickup decreases and while driving, the temperature increase in the vicinity of the optical pickup can not be prevented by the increase of electric power consumption. Also, the specific gravity of the composition of 1.00 or less is not preferable since flexible modulus of the composition in the composition is made to decrease. In order to make to exhibit those effects more preferable, the specific gravity of the composition is made not to exceed 1.30. However, the specific gravity means that of the molded product.

The molded product obtained from the above mentioned wholly aromatic liquid crystal polyester resin composition by the injection molding provides excellent heat resistance, injection molding processability, mechanical properties, low specific gravity and low thermal conductive properties, and is useful for plastics material applied for the sheet form optical pickup lens holder in the recent years.

EXAMPLES

The present invention will be described in reference to Examples and Comparative Examples, which should not be construed as a limitation upon the scope of the invention.

Production examples of wholly aromatic liquid crystal polyester resins will be described as follows.

Production of Liquid Crystal Polyester A p-Hydroxybenzoic acid 1330.1 g (9.63 mol), p,p'-biphenol 597.7 g (3.21 mol), terephthalic acid 453.5 g (2.73 mol), and isophthalic acid 79.7 g (0.48 mol) are fed into a 6 L polymerization reactor which is made of SUS316 as material (Manufactured by Nitto koatsu Co., Ltd.) and is equipped with a double-helical agitator, and after having replacement with nitrogen gas by conducting vacuum-nitrogen gas purge repeating for two times, acetic anhydride 1736.9 g (17.0 mol) is added, and an acetylation reaction is carried out to raise temperature up to 150° C. in one hour with the agitating speed of 100 rpm and then for 2 hours under refluxing state.

After the acetylation reaction, distilling acetic acid, raising temperature with a rate of 0.5° C./minute to 330° C., the polymer is discharged from the discharge gate at the bottom of the reactor. The discharged polymer is ground to 20 mesh or less by a grinder and the solid phase polymerization is carried out by a heating device (Manufactured by Asahi Shoukou Co., Ltd.) equipped with a cylindrical rotational reactor. The powdered polymer is fed to the cylindrical rotational reactor, and while nitrogen gas is flown at a flow rate of one litter/minute, the temperature is raised to 280° C. with taking 2 hours at 20 rpm and held for 3 hours at 280° C., and then raised to 300° C. in 30 minutes and held for 3 hours at 300° C., and raised to 310° C. in 30 minutes and held for 3 hours, and then the polymer is obtained after cooling to the room temperature in one hour. The obtained polymer has the melting point at 378° C. and the optical anisotropy at melting state is observed by a polarized microscope at 400° C.

Production of Liquid Crystal Polyester B p-Acetoxybenzoic acid 810 g (4.50 mol) and 6-acetoxy-2-naphthoic acid 690 g (3.00 mol), are fed into a 6 L polymerization reactor which is made of SUS316 as a material (Manufactured by Nitto kouatsu Co., Ltd.) and is equipped with a double helical agitator, and after having replacement with nitrogen gas by conducting a vacuum-nitrogen gas purge repeating for two times, the temperature is raised to 300° C. in 2 hours at agitating speed of 100 rpm and after polymerization is conducted for 30 minutes at 300° C., and for 30 minutes at 320° C., and then for 2 hours at 320° C. under reduced pressure at 8.0 torr, the reaction mixture is discharged from the system and ground to 20 mesh or less by the grinder.

The powdery product is carried out for the solid phase polymerization by a heating device (Manufactured by Asahi Shoukou Co., Ltd.) equipped with a cylindrical rotational reactor. The ground polymer is fed to the cylindrical rotational reactor, and while the nitrogen gas is flown at a flow rate of one litter/minute, a liquid crystal polyester is obtained by treating 5 hours at 240° C. at agitating speed of 20 rpm. The obtained polymer has the melting point of 281° C. Also, the optical anisotropy at a melting state is observed by a polarized microscope at 320° C.

The fillers used in Examples and Comparative Examples are described as follows.
(1) S-60 (Trade name): Inorganic spherical hollow material, manufactured by Sumitomo 3M Limited, (an aspect ratio 1, an average particle diameter 30 μm, a true specific gravity 0.60, a material specific gravity 2.50, a volume hollow rate 76%).
(2) PZ-6000 (Trade name): Inorganic spherical hollow material, manufactured by Tokai Kogyo Co., Ltd. (an aspect ratio 1, an average particle diameter 40 μm, a true specific gravity 0.75, a material specific gravity 2.50, a volume hollow rate 70%)
(3) PX-1 (Trade name): Glass fiber (Chopped glass fiber), manufactured by Asahi Fiber Glass Co., Ltd. (an aspect ratio 350, an average fiber diameter 10 μm, an average fiber length 3.5 mm, a specific gravity 2.54)
(4) MSKY (Trade name): Talc, manufactured by NIPPON TALC Co., Ltd.) (an aspect ratio 7, an average particle diameter 24 μm, a specific gravity 2.77)

Production of Wholly Aromatic Liquid Crystal Polyester Resin Compositions

Examples 1 to 8, Comparative Examples 1 to 5

By using a twin-screw extruder having a cylinder diameter of 46 mm, (KTX-46 manufactured by KOBE STEEL LTD.; intermeshing rate=1.45), a liquid crystal polyester is fed from the uppermost stream portion, and the inorganic spherical inorganic filler of predetermined percent by mass is fed from the down stream portion and pellets are obtained by conducting a melt extrusion. In this case the output of extrusion is 100 kg/hour. The maximum cylinder temperatures when the liquid crystal polyester A used is made to be 390° C. and when the liquid crystal polyester B used is made to be 350° C.

Preparation of specimen and the like: The specimens are prepared by the injection molding machine UH-1000, manufactured by Nissei Plastic Industrial Co., Ltd. Resin composition having liquid crystal polyester A is molded at cylinder temperature 390° C., and resin composition having liquid crystal polyester B is molded at cylinder temperature 300° C.

(1) Flexural Modulus

Flexural modulus is measured by 40 mm×12.7 mm×0.3 mm test piece, at span length 30 mm in accordance with ASTM D790.

(2) Specific Gravity

Specific gravity is measured by 65 mm×12.7 mm×3.0 mm test piece, in accordance with ASTM D790.

(3) Soldering Heat Resistance 1 mm thick dumbbell according to ASTM1822 is molded by the injection molding machine MIN7, manufactured by Niigata Engineering Co., Ltd. (Temperature condition is as same as described above.) and the maximum temperature which a deformation or a warpage is not generated by dipping to soldering bath at a certain temperature, is treated as a soldering heat resistance temperature.

(4) Processability (Processability for Optical Pickup Lens Holder)

The optical pickup lens holder described in FIG. 1 is molded by the injection molding machine. The evaluations are conducted as ○ (good) where the injection molding can be performed with relatively low injection pressure, and as x (poor) where the injection molding is incapable to mold or capable with the occurrence of mold sticking or occurrence of short-shot.

Furthermore, the appearance of edge part in thin thickness part (about 0.3 mm) which forms the outer edge, is observed by a magnifier, and one with the extremely clearly appeared edge is indicated as ○ (good), and one with unfilled part confirmed is indicated as x (poor).

(5) Temperature of Optical Pickup

The optical pickup lens holder is formed by attaching the object lens to the opening port A of molded lens holder, coil to the opening ports B, B, and the temperature in the vicinity of coil is measured while making driving after attaching to 8-times speed DVD-R.

The composition ratios of Examples and Comparative Examples and each evaluation results are shown in Table 1.

TABLE 1

| Composition (Mass %) | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|
| (1) Wholly Aromatic Liquid Crystal Polyester | | | | | | | | | | | | |
| Liquid Crystal Polyester A (Melting Point = 378° C.) | 95 | 70 | 80 | 60 | 60 | 60 | 70 | 40 | 100 | | 70 | 70 |
| Liquid Crystal Polyester B (Melting Point = 281° C.) | | | | | | | | | | 70 | | |

TABLE 1-continued

| Composition (Mass %) | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|
| (2)Inorganic Spherical Hollow Material | | | | | | | | | | | | |
| S60 (Aspect Ratio = 1) | 5 | 30 | 15 | 20 | 20 | | | 60 | | 30 | | |
| PZ6000 (Aspect Ratio = 2) | | | | | | 30 | 30 | | | | | |
| (3)Inorganic Filer Aspect Ratio 4 or more | | | | | | | | | | | | |
| PX-1(Glass fiber) (Aspect Ratio = 350) | | | 5 | 20 | | | | | | | 30 | |
| MSKY(Talc) (Aspect Ratio = 7) | | | | | 20 | 10 | | | | | | 30 |
| Characteristic Properties | | | | | | | | | | | | |
| Flexural Modulus (GPa) | 12.0 | 11.4 | 11.8 | 14.1 | 11.3 | 11.1 | 11.5 | Incapable Molding | 13.2 | 10.8 | 25.0 | 16.8 |
| Specific Gravity | 1.30 | 1.01 | 1.20 | 1.27 | 1.28 | 1.07 | 1.24 | — | 1.38 | 1.02 | 1.60 | 1.62 |
| Soldering Heat Resistance(° C.) | 320 | 325 | 330 | 340 | 320 | 320 | 330 | — | 300 | <300 | 340 | 330 |
| Processability 1 (Pressure Required for Packing) | ○ | ○ | ○ | ○ | ○ | ○ | ○ | Incapable Molding | ○ | ○ | ○ | ○ |
| Processability 2 (Thin Edge Part Shape) | ○ | ○ | ○ | ○ | ○ | ○ | ○ | Incapable Molding | x | ○ | ○ | ○ |
| Temperature of Optical Pickup Lens Holder(° C.) | 100 | 85 | 95 | 100 | 100 | 85 | 100 | — | 110 | 85 | 120 | 120 |

According to Table 1, regarding the molded product of wholly aromatic liquid crystal polyester resin of the present invention (Examples), the temperature in the vicinity of the coil of the optical pickup lens holder can be regulated in low, and the injection molded product having thickness part of 0.3 mm or less can be molded in the flowability evaluation test. Also, the soldering heat resistance properties and processability exhibit superiority. On the contrary, as in Comparative Examples, the resin composition using the liquid crystal polyester which is different from the present invention, as in Comparative Examples 4 and 5, in case that the inorganic spherical hollow material is not blended, the problem that the temperature in the vicinity of the coil of the optical pickup lens holder raises occurred. And also, as in Comparative Examples 1 and 2, in case that the inorganic spherical hollow material is in the out of range of the present invention, the processability results to present the problem. Also, as in Comparative Example 3, in case that the melting point of the wholly aromatic liquid crystal polyester deviates from the specified range, soldering thermal resistance is resulted to deteriorate.

INDUSTRIAL APPLICABILITY

The optical pickup lens holder according to the present invention is useful, even sheet form optical pickup lens holder having thin thickness part or opening port, since the injection molding processability and applicability to soldering process are high and the temperature increase in the vicinity of driving coil is controlled.

The invention claimed is:
1. A wholly aromatic liquid crystal polyester resin composition injection molded to form an optical pickup lens holder, the optical pickup lens holder having a specific gravity in a range of 1.00 to 1.35, and having a part and an opening portion holding a lens, said part having a thickness of 0.3 mm or less, the composition comprising (a) 97 to 45 percent by mass of a wholly aromatic liquid crystal polyester having a melting point of 320° C. or higher and an apparent viscosity at 20° C. above the melting point of 5,000 poise or less, (b) 3 to 50 percent by mass of an inorganic spherical hollow material having an aspect ratio of 2 or less, and (c) 0 percent by mass of an inorganic filler having an aspect ratio of 4 or more.

2. The wholly aromatic liquid crystal polyester resin composition according to claim 1, wherein said wholly aromatic liquid crystal polyester is prepared by the polycondensation of I, II, III, and IV, wherein I is p-hydroxybenzoic acid or a p-hydroxybenzoic acid derivative having repeating structural units represented by the following formula, wherein $X_1$ is selected from the group consisting of halogen atoms and alkyl groups:

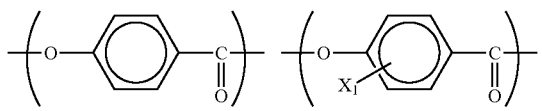

wherein II is terephthalic acid or a terephthalic acid derivative having repeating structural units represented by the following formula, wherein $X_2$ is selected from the group consisting of halogen atoms, alkyl groups and aryl groups:

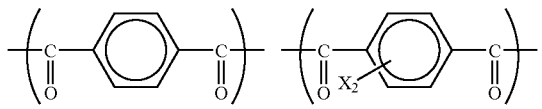

wherein III is 4,4' dihydroxydiphenyl or a 4,4'-dihydroxydiphenyl derivative having repeating structural units represented by the following formula:

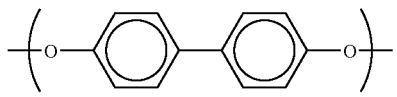

wherein IV is one or more other aromatic compounds capable of conducting a polycondensation reaction with any one of I, II, or III, and selected from the group consisting of aromatic diols, aromatic hydroxycarboxylic acids and aromatic dicarboxylic acids, and wherein the total of I, II, and III is 80 to 100 percent by mole, the total of I and II is more than 60 percent by mole, and IV is 0 to 20 percent by mole.

3. The wholly aromatic liquid crystal polyester resin composition according to claim 1, wherein the inorganic spherical hollow material having an aspect ratio of 2 or less has an average particle diameter of 5 to 200 μm, and a rate of volume hollowness of 50 percent or more.

4. An optical pickup lens holder in a sheet form driven by a focusing coil and a tracking coil, comprising an injection molded product, the injection molded product having a specific gravity in a range of 1.00 to 1.35, obtained from a wholly aromatic liquid crystal polyester resin composition, comprising 97 to 45 percent by mass of a wholly aromatic liquid crystal polyester having a melting point of 320° C. or higher and an apparent viscosity at 20° C. above the melting point of 5,000 poise or less, 3 to 50 percent by mass of the inorganic spherical hollow material having an aspect ratio of 2 or less, and 0 percent by mass of the inorganic filler having an aspect ratio of 4 or more, wherein said optical pickup lens holder comprises a part with thickness of 0.3 mm or less, and said part has a flexural modulus of 10 GPa or more.

5. The optical pickup lens holder according to claim 4, wherein said optical pickup lens holder comprises an opening portion to hold a coil bobbin for the focusing coil or the tracking coil.

6. The wholly aromatic liquid crystal polyester resin composition according to claim 2, wherein:
the inorganic spherical hollow material having an aspect ratio of 2 or less has an average particle diameter of 5 to 200 μm, and a rate of volume hollowness of 50 percent or more.

7. The optical pickup lens holder according to claim 4, wherein the wholly aromatic liquid crystal polyester is prepared by the polycondensation of I, II, III, and IV, wherein I is p-hydroxybenzoic acid or a p-hydroxybenzoic acid derivative having repeating structural units represented by the following formula, wherein $X_1$ is selected from the group consisting of halogen atoms and alkyl groups:

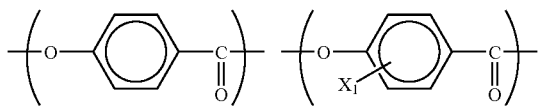

wherein II is terephthalic acid or a terephthalic acid derivative having repeating structural units represented by the following formula, wherein $X_2$ is selected from the group consisting of halogen atoms, alkyl groups and aryl groups:

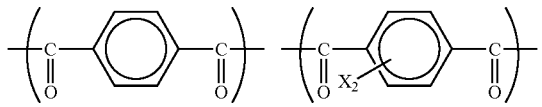

wherein III is 4,4' dihydroxydiphenyl or a 4,4'-dihydroxydiphenyl derivative having repeating structural units represented by the following formula:

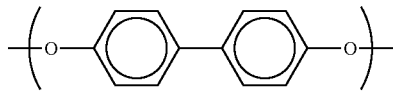

wherein IV is one or more other aromatic compounds capable of conducting a polycondensation reaction with any one of I, II, or III, and selected from the group consisting of aromatic diols, aromatic hydroxycarboxylic acids and aromatic dicarboxylic acids, and wherein the total of I, II, and III is 80 to 100 percent by mole, the total of I and II is more than 60 percent by mole, and IV is 0 to 20 percent by mole.

* * * * *

UNITED STATES PATENT AND TRADEMARK OFFICE
CERTIFICATE OF CORRECTION

PATENT NO.          : 7,790,786 B2
APPLICATION NO.     : 11/578980
DATED               : September 7, 2010
INVENTOR(S)         : Satoshi Murouchi et al.

It is certified that error appears in the above-identified patent and that said Letters Patent is hereby corrected as shown below:

Front page, (75) Inventors, reads:

"Satoshi Murouchi, Yokohama (JP);
Toshio Nakayama, Kawasaki (JP);
Yoshikuni Yamada, Kawasaki (JP)"

Should read as follows:

--Satoshi Murouchi, Yokohama-shi (JP);
Toshio Nakayama, Kawasaki-shi (JP);
Yoshikuni Yamada, Kawasaki-shi (JP)-- and Column 8, line 36, "flyash" should read --fly ash--.

Signed and Sealed this
Thirtieth Day of October, 2012

David J. Kappos
*Director of the United States Patent and Trademark Office*